United States Patent [19]

Freed et al.

[11] Patent Number: 4,658,986

[45] Date of Patent: Apr. 21, 1987

[54] PRESSURE-MONITORING SYSTEM

[76] Inventors: Edward E. Freed, 4190 Del Mar Ave., Long Beach, Calif. 90807; Kenneth D. Dowd, 6202 Trinette Ave., Garden Grove, Calif. 92645

[21] Appl. No.: 754,338

[22] Filed: Jul. 11, 1985

Related U.S. Application Data

[63] Continuation-in-part of Ser. No. 645,025, Aug. 28, 1984, abandoned.

[51] Int. Cl.[4] ........................ B67D 5/08; G01M 3/08; F04B 49/10

[52] U.S. Cl. ........................................ 222/52; 222/61; 222/63; 73/40.5 R; 417/9

[58] Field of Search ...................... 222/52, 63, 61, 638; 73/40.5 R; 417/9; 364/479, 510; 340/605, 611

[56] References Cited

U.S. PATENT DOCUMENTS

| | | | |
|---|---|---|---|
| 3,261,201 | 7/1966 | Pottash | 73/40.5 R |
| 3,958,449 | 5/1976 | Drescher et al. | 73/40.5 R |
| 3,966,088 | 6/1976 | Reynolds | 222/63 |
| 4,397,405 | 8/1983 | Batson | 222/20 |

*Primary Examiner*—Joseph J. Rolla
*Assistant Examiner*—Gregory L. Huson
*Attorney, Agent, or Firm*—Christie, Parker & Hale

[57] ABSTRACT

A pressure-monitoring system for detecting pressure between a fuel pump in a fuel storage tank and a fuel dispenser in automotive fuel service stations. The pressure-monitoring system utilizes a pressure-sensitive switch interconnected in the dispensers. A controller is associated with the pressure sensitive switch and the fuel pump utilized to extract fuel from the fuel storage tank. Upon the detection of a leak in the lines between the pump and the fuel dispenser, the controller interrupts the electrical circuitry to the pump and disables the pump until the leak has been located and repaired.

10 Claims, 3 Drawing Figures

PRESSURE-MONITORING SYSTEM

CROSS REFERENCE TO RELATED APPLICATION

This application is a continuation-in-part of application Ser. No. 645,025, filed Aug. 28, 1984, and now abandoned.

FIELD OF THE INVENTION

The present invention relates to pressure-monitoring and product-monitoring systems, and in particular, to automatic systems for disabling submersible pumps in fuel storage tanks to prevent further pumping of fuel from the storage tank in the event a leak occurs in lines from the storage tank to a fuel dispenser.

BACKGROUND OF THE INVENTION

Recent legislation has imposed new constraints on the operation of automotive service stations. In order to prevent the contamination of groundwater supplies, many states are now enacting laws which are designed to deter or prevent leakage from fuel storage tanks and the supply lines interconnecting the storage tanks and the fuel dispensers. These laws have become known as secondary containment laws.

In essence, these laws require that precautions be taken to prevent the occurrence of leakage and the possibility that fuel lines or fuel tanks which have become defective will develop leaks which can continue to allow fuel to seep out into the underground in the vicinity of the service station. The term secondary containment means the provision of a second enclosure surrounding the primary or main fuel enclosure so that if a leak does occur in the primary enclosure it will be confined within the secondary enclosure and cannot seep out.

Such laws impose a significant hardship on existing service stations in which equipment is already in place. To bring such stations into compliance with these laws by installing such a secondary enclosure would require digging up the existing fuel tanks and replacing them with new equipment having the inner and outer containment construction. It would likewise entail providing new plumbing for the supply lines from the fuel storage tank to the pumps in order to bring these lines up to code so that they satisfy the legal requirements.

The intent and purpose of so-called secondary containment laws is to ensure against leakage of fuel and other pollutants and contaminants into the subsoil surrounding a service station location. Utilization of means other than a second container is also permitted and contemplated by such laws.

An alternative approach to secondary containment involves equipment to detect a leak and upon such detection interrupting the operation of fuel supply pumping. A "leak" within the scope of National Fire Protection Association (NFPA) standards involves a very low flow rate; presently, such low flow rate is 0.050 gallons per hour. Accurate detection of such a very low flow rate has presented problems. It should be borne in mind that the dynamic range of flow rate is quite large. Many times more gallons per hour flow during peak flows in a dispensing operation than the very low flow rate involved in such a "leak." Particularly toward the end of a dispensing operation the flow rate of gasoline being pumped is substantially lower than such peak flow rate. It is undesirable not only to fail to detect a leak but also to generate what amounts to a false alarm when there is no leak. In prior art approaches to a system for leak detection and pump interruption, the organization of the system lends itself to an undue number of such false alarms.

SUMMARY OF THE INVENTION

The present invention provides an improved alternative to a secondary containment system by providing a pressure-monitoring and product-monitoring system for automotive fuel service station operations, which comprises a fuel storage tank, at least one fuel dispenser and a supply line interconnecting the storage tank and the fuel dispenser. A pump is located in the storage tank for extracting fuel therefrom and directing it to the fuel dispenser. Means are located in the supply line for sensing line pressure between the pump and the dispenser, and control means are electrically interconnected to the pressure-sensing means and the pump. The control means cooperates with the pressure-sensing means throughout an indefinite period of time between dispensing operations to detect a need to repressurize the system.

The control means cooperates with the pressure-sensing means to detect a leak and upon such detection stops the pump from operating. An important feature of the invention involves timing. In particular, it has been discovered that a true leak is manifested by a pressure drop to below a predetermined threshold during a predetermined interval immediately following the end of a dispensing operation. An advantageous feature of this invention is that the control means provides for defining a sampling interval by digital counting up to a predetermined number. The predetermined number is easily changed by programming, and is desirably set so that the sampling interval equals the above-mentioned predetermined interval. It has been discovered that the best duration for the sampling interval is five minutes. If during the sampling interval, the pressure sensed by the pressure-sensing means crosses a threshold pressure, thereby manifesting a leak, the control means responds by causing the pump to discontinue operation.

Another advantageous feature of the invention involves detection of a need to re-pressurize the supply line to the dispenser. During the indefinite period of time between the end of one dispensing operation and the beginning of the next dispensing operation, the control means cooperates with the pressure-sensing means to detect such need for re-pressurization. If the pressure sensed by the pressure-sensing means during this indefinite period of time crosses a threshold pressure condition, thereby indicating the need to re-pressurize, the control means responds accordingly, and then preferably recycles through the sampling-interval check for a leak.

As a pressure-monitoring system, the preferred embodiment of the present invention provides a means for swiftly detecting a leak by utilizing a pressure-sensitive switch which can be installed in the supply line leading from the pump to the fuel dispenser. The pressure-sensitive switch is a conventional relatively low cost device having a pressure sensing transducer and associated electrical switch that is either open or closed, depending upon the amount of pressure acting on the transducer. Suitably, as set forth in the specific description of the preferred embodiment of this invention, the electrical switch is open when the pressure is above a threshold, and is closed when the pressure is below such threshold. An electrical circuit connects the electrical switch to the control means to send a status signal to the control means. If, during the sampling interval, the status signal from the pressure-sensitive switch manifests a leak condition, the control means, which is electrically interconected between the pressure-sensitive means and the pump on the storage tank, immediately interrupts the power circuit to the pump, disabling the pump and preventing further operation thereof until such time as the system has been serviced and the leak has been repaired.

As a product-monitoring system, the present invention utilizes a product-sensitive probe for detecting the presence and/or volume of a product in a storage tank, well, or connecting line, as well as in areas external to tanks, etc., such as the annular space between inner and outer containers of a secondary containment system. Product-sensitive probes capable of detecting, for example, the presence of hydrocarbons, are contemplated for use with the system as tank probes, oil and gas well probes, probes to monitor inventory, probes used in security applications, as well as probes used in leak detection applications, and in conjunction with the pressure-transducer in a pressure-monitoring system according to the present invention.

DESCRIPTION OF THE DRAWINGS

These and other features of the pressure-monitoring and product-monitoring system of the present invention will be better understood by reference to the drawings wherein.

DESCRIPTION OF A SPECIFIC EMBODIMENT

Figure 1:
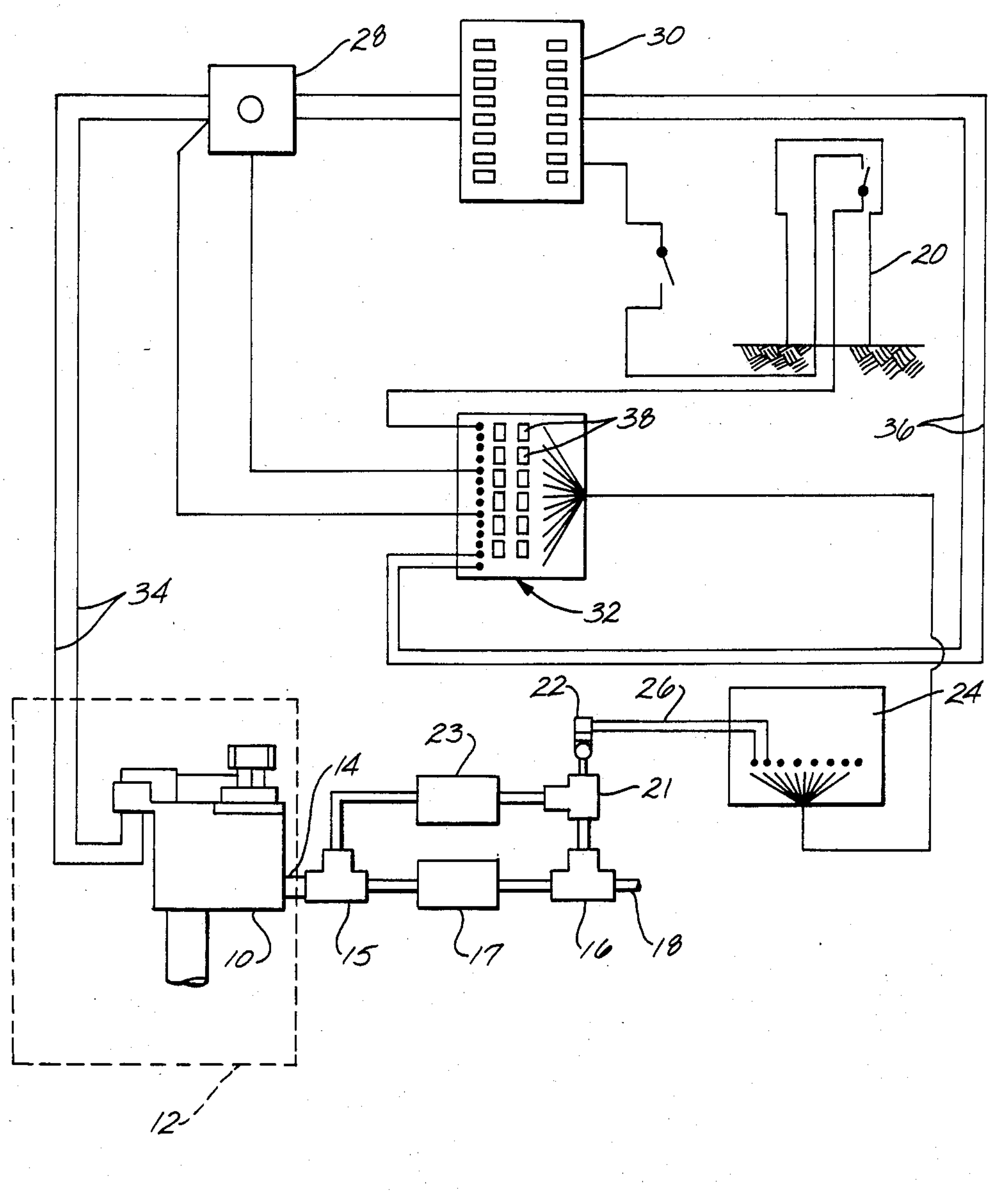
FIG. 1 shows a block diagram of the system, including the fuel storage tank, pump, pressure-sensitive switch, cabinet panel and controller.

The components of the invention of the pressure-monitoring system (PMS) according to the present invention are shown in FIG. 1. As shown therein, a submersible pump 10 is located within a fuel storage tank 12. Immediately downstream of the outlet 14 from the pump 10, there is a coupling 15, and further downsteam there is a coupling 16. Between the couplings 15 and 16, there is an in-line check valve 17 which is recommended even though commonly a submersible pump has an internal check valve. This recommendation is based on experience with failures of such internal check valves to hold pressure. Coupling 16 is a T, one port of which is connected to a line 18 which supplies fuel under the motive force of the pump from the fuel storage tank to a dispenser 20. Another port of coupling 16 is connected through a coupling 21 to a pressure-sensitive switch 22. Switch 22 is secured to coupling 16 so as to be exposed to pressure in line 18 in which the fuel moves from the fuel storage tank to the dispenser under normal conditions. Each of couplings 15 and 21 is a T, and each has a port connected to a pressure relief valve 23. The couplings 15 and 16, check valve 17, coupling 21, pressure switch 23, and pressure relief valve 23 all form a monitor unit 40. The pressure-sensitive switch is electrically connected to a controller 24 by means of an electrical connection 26. Power is supplied to the entire system from a circuit breaker panel 30. The breaker panel 30 is wired to the relay cabinet 32, which in turn is wired to controller 24, and to product relay 28 for dispensing pump 20. Line voltage, typically 110–120 volts (VAC), is wired to relay cabinet 32 and to the pressure-monitoring system via line 26 to breaker panel 30.

In a specific embodiment, the pressure switch 22 is a model SB12B manufactured and sold by ASCO. It comprises a fixed differential-type pressure switch attached to a diaphragm-type transducer. It is explosion-proof (designed to 3, 3F, 4, 7B, 7C, 7D, 9E, 9F and 9G NEMA specs). The transducer is Viton and stainless steel construction. The electrical wiring is connected through conduit hubs. The switch can be mounted in any position, is vibration resistant, and can withstand pressure surges. The transducer used with the switch can be repaired or replaced independently in the field. The set point is adjusted by using an external locking nut. Preferably, the set point is 4 psi. In this specific pressure switch, its internal electrical switch is open when the sensed pressure is at or above 4 psi, and is closed when the sensed pressure is below 4 psi.

When the pump 10 is operating and fuel is flowing to the dispenser 20, the pressure developed by the pump at its outlet 14 is about 28–35 psi. A relatively insignificant pressure drop exists across check valve 17. Thus, during a dispensing operation, the pressure being sensed by pressure switch 22 is close to about 28 psi, and the internal electrical switch is open. At the end of the dispensing operation, the pump turns off because of the opening of one of series-connected electrical switches in the electric power circuitry for the pump. When the pump is turned off, the pressure at outlet 14 begins to drop below the pressure in line 18. Check valve 17 closes almost immediately. At this point in time, a pressure differential begins to develop across pressure relief valve 23. When that pressure differential reaches a set point, the pressure release valve opens to bleed fuel back to the line 14; then it closes again when, as a result of such bleeding, the pressure differential drops below the set point. When the pressure relief valve recloses, the pressure being sensed by the pressure switch is about 12 psi. This pressure of course is still high enough that the electrical switch within pressure switch 22 remains open.

Controller

The controller 24 is constructed in accordance with known digital computer techniques. Suitably, it includes various conventional integrated circuits including a programmable microprocessor, a read only memory (ROM) for storing program code, a random access memory (RAM), and the appropriate interfacing circuits commonly used to transfer signals to bus circuitry.

Controller 24 is powered with 24 VAC. One (1) to five (5) volt signals are transmitted to controller 24 from remotely located pressure switches, transducer units, or product-sensitive probes. Each dispenser, like dispenser 20, has an electrical switch that is either open or closed depending upon whether it is being used in a dispensing operation. A signal indicating the open or closed status of this signal is received by controller 24 via electrical connections illustrated in FIG. 1 from the dispenser through the relay cabinet 32 to controller 24. Based on such signal, the controller 24 can determine when a dispensing operation ends, and when another dispensing operation begins. The controller is fully self-supervised and self-diagnosing regarding the circuitry within the PMS system. The controller interprets the data it receives and can institute a variety of actions, depending upon the requirements programmed into the controller. Programmable features include system activation, repressurizing time, variable repressurizing cycle, second-chance shutdown, probe- or switch-prompted shutdown (independently by product or all products), as well as other trouble-condition reactions.

Controller 24 has communications receipt and sending capability and can function on "normally open" or "normally closed" signals. It has an audiovisual alarm package (the audio can optionally be silenced) operationally keyed to probe or pressure-sensitive switch system condition indicators. It has manual by-pass functions and by-pass function end signal; breaker condition indicators; remote programming; a diagnostic microprocessor; keyed access for manual override and pump operation indicators.

In operation, the pressure-monitoring system operates in the following manner: During the start-up routine, the operator begins by operating the circuit breakers at panel 30 to the pumps and to the pressure-monitoring system. If the circuit breaker for the pressure-monitoring system is not turned on, controller 24 will not activate fuel pump 10 or any other fuel pumps in the service station. The system is also arranged so as to inform the operator by means of a light display panel at breaker panel 30 that one or more of the pump breakers has not been turned on.

The controller is provided with a series of panel lights which are checked by the operator to make sure that all components of the system are functioning. An audible alarm is also provided with the controller, in the event a leak is detected when the operator is out of direct line of sight of the controller.

When the system has been turned on, controller 24 runs submersible pump 10 and any other submersible pumps associated with other fuel storage tanks at the service station through a series of pre-programmed steps. During the start-up pressurization operation (or during a re-pressurization operation), the supply lines are pressurized to a predetermined pressure (28-35 psi) to compensate for any thermal contraction or other changes which may have occurred since the system was turned off the previous night. Under the programming of the controller, each pump 10 is independently turned on to protect against current surges which may be encountered if a plurality of fuel pumps were turned on simultaneously. As soon as pump 10 finishes pressurizing the supply line, the pump is turned off. As a result of the operation described above concerning the check valve 17 and the pressure relief valve 23, the supply lines 18 normally maintain a predetermined amount of pressure (about 12 psi).

As explained in more detail below with reference to FIG. 2, when a leak occurs anywhere between the pump 10 and a pilot valve 42 in the dispenser 20, the system of the present invention will open the circuit 34 to the product relay for pump 10, turning it off to prevent the delivery of any more product to dispenser 20. At the same time, an audible and a visual alarm is activated to alert the operator to the occurrence of a leak. The controller is alternatively located in the service station itself adjacent breaker panel 30, or, in the case of self-service stations, is located in view of the cashier in the booth.

Before the system can be rendered operational again the leak must be repaired. The controller is provided with a manual override switch to enable to repairman to pressurize the piping system to enable him to check the supply line for a leak. If a leak is not found at pump 10 or dispenser 20, then a line pressure test is run to verify the presence of a line leak. After repairs have been completed, the manual override switch is cancelled; the controller sequences the system back into operation; and the dispensers are armed again for the delivery of fuel.

The controller of the pressure-monitoring system according to the present invention is self-diagnosing. If a circuitry problem is encountered within the controller, if a wire is disconnected anywhere in the system, or if a conduit is severed, the trouble alarm is immediately activated and the electrical circuitry of pump 10 opened to interrupt the delivery of power to the pump. In those areas which do not require that the pump be shut down in the event of a trouble light, the system will simply alarm audibly and visibly.

In those stations where a plurality of fuel storage tanks are used, each supply system operates independently. When one system is down due to a loss of pressure (leak), the other systems remain functional. The pressure-monitoring system monitors each system independently through its controller and is capable of monitoring up to four pumping systems simultaneously.

Figure 2:
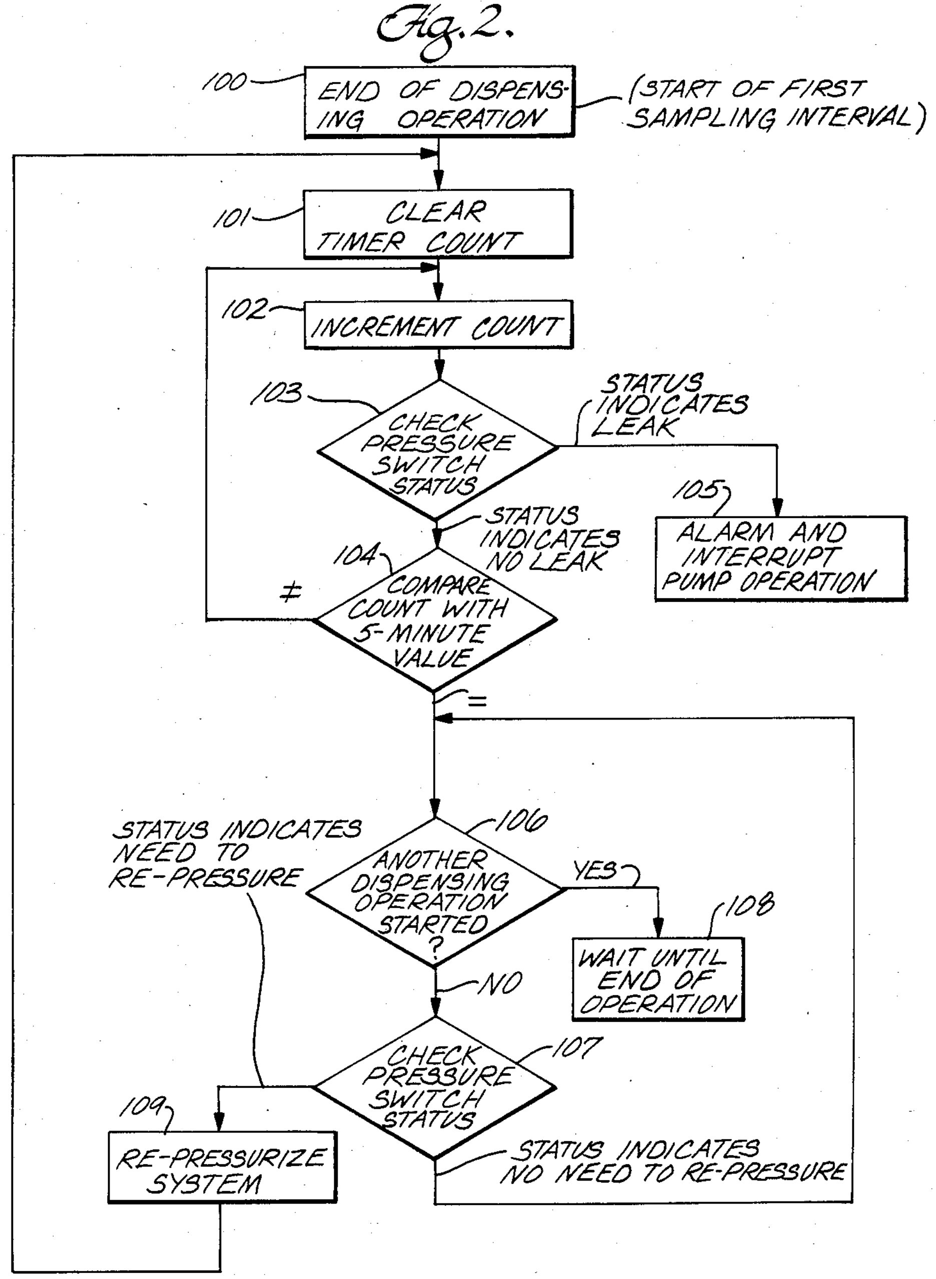
FIG. 2 shows a flow chart of operation including the sampling interval which commences immediately following the end of a dispensing operation.

Reference is now made to the flow chart of FIG. 2. As indicated in the top block (100) of the flow chart, the end of a dispensing operation coincides with the commencement of the start of the sampling interval defined by the operation of controller 24. Immediately after the end of the dispensing operation, the microprocessor within controller 24 clears a register (which may be a memory location within the random access memory). This operation is indicated in the block 101 of the flow chart.

After the above-mentioned clearing operation, a looping operation proceeds involving the operations indicated in blocks 102, 103, 104, and back to 102.

Each time through the loop, the microprocessor increments the count (block 102), then checks the pressure switch status (block 103), then compares the count with the value corresponding to five minutes of counting (block 104). If the count is less than the five-minute value, the microprocessor proceeds to loop back to increment the count again (block 102). In the specific embodiment described herein, the electrical switch within pressure switch 22 will be open if the pressure is above 4 psi. The open status of that electrical switch during the first sampling interval indicates a no-leak condition. A closed status indicates a leak condition. Thus, if the pressure being sensed falls to below 4 psi at any time during the five-minute sampling interval, the sequence of operation will be such as to proceed from block 103 to a block 105 to cause an alarm and an interruption of the pump operation.

Upon completion of the sampling interval (i.e., when block 104 is exited to enter block 106), a second looping operation proceeds during the indefinite period of time between dispensing operations. This looping operation involves the operations indicated in blocks 106 and 107, and back to 106. Each time through this second loop, the microprocessor during block 106 checks whether another dispensing operation has started (as indicated by a change of the status of switches such as the switch depicted in the dispenser 20). If so, as indicated in block

108, the microprocessor waits until the end of the dispensing operation, and then starts at block 100 again. If another dispensing operation has not started, as determined in block 106, the microprocessor then checks the pressure switch status (block 107). If during the indefinite interval the electrical switch in the pressure switch 22 is open (i.e., pressure is above 4 psi), its status indicates no need to repressurize. Thus, following block 107, the sequence proceeds to loop back to block 106 each time through the loop. If, however, the electrical switch is closed (i.e., pressure is below 4 psi), its status indicates a need to repressurize. In this event, following block 107, the sequence of operation will be such as to proceed from block 107 to a block 109 to cause repressurization of the system. Following such repressurization, the entire cycle is repeated as indicated in the flow chart by the line connecting block 109 back to block 101 where the timer count is cleared.

The system of the present invention is also used with productsensitive probes which are used with storage tanks, supply lines, wells and the like to detect the presence or absence of a particular substance such as hydrocarbon, e.g., oil, natural gas, or refined hydrocarbons such as gasoline.

Figure 3:
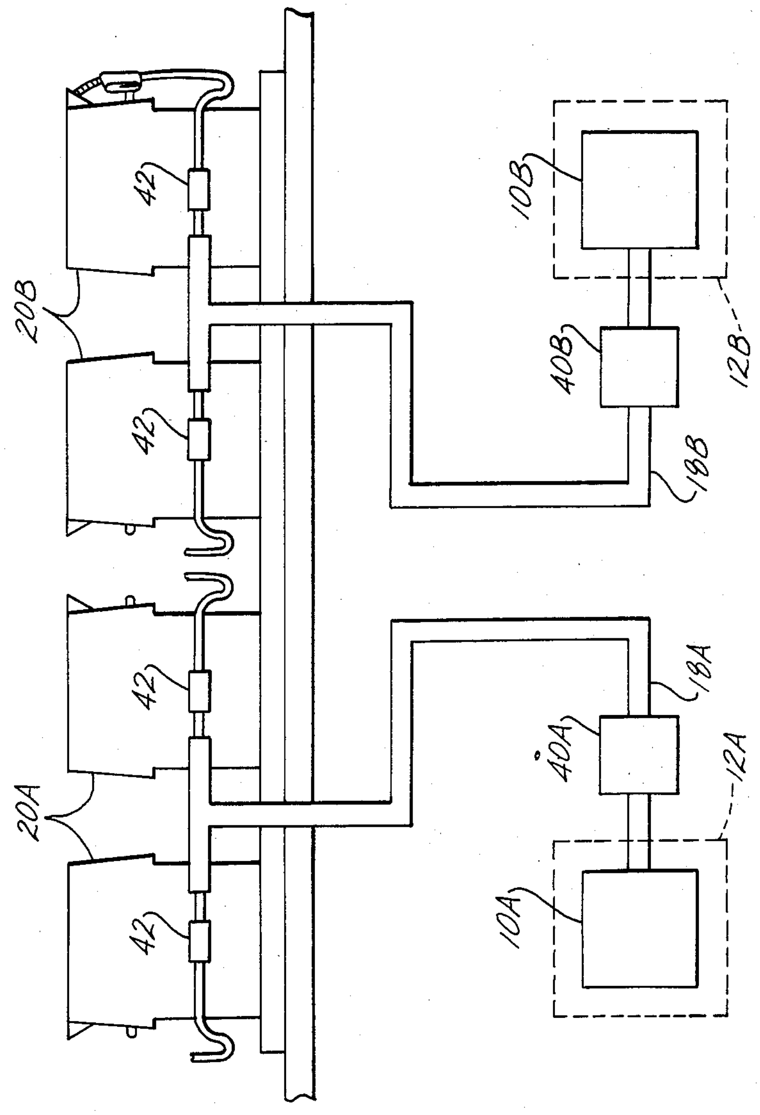
FIG. 3 shows a block diagram of the system showing a plurality of fuel storage tanks and a plurality of dispensers.

FIG. 3 shows a plurality of fuel storage tanks 12A and 12B, each having respective monitoring units 40A and 40B. Lines 18A and 18B each provide fuel to a plurality of dispensers 20A and 20B, respectively. Each fuel dispenser has a pilot valve 42.

Probe

In conjunction with the secondary containment-type applications, the product-sensitive probe sends an "open" or "closed" signal to the controller to indicate the presence of the product, either internal to the annular space of a double-walled tank or external to the tank or system entirely.

What is claimed is:

1. A pressure-monitoring system for automotive fuel service stations comprising:

(a) a fuel storage tank;

(b) at least one fuel dispenser;

(c) a supply line interconnecting the storage tank and the fuel dispenser;

(d) a pump located with respect to the supply line for passing fuel from the storage tank to the fuel dispenser;

(e) means located in the supply line for sensing pressure between the pump and the dispenser; and (f) control means for defining a sampling interval following the end of a dispensing operation, and being electrically interconnected to the pressure sensing means and the pump, for disabling the pump when the pressure sensed by the sensing means during the sampling interval crosses a predetermined threshold, wherein the control means cooperates with the pressure sensing means throughout an indefinite period of time between dispensing operations to detect a need to repressurize the system, and wherein, upon such detection, the control means responds by causing repressurization of the system.

2. A system according to claim 1 wherein the means for sensing pressure is a pressure-sensitive switch.

3. A system according to claim 2 wherein the control means defines the sampling interval by counting.

4. A system according to claim 3 including a plurality of fuel dispensers connected to the pump, each of said fuel dispensers having a pilot valve.

5. A system according to claim 4 including a check valve associated with the pump.

6. A system according to claim 5 wherein the pressure sensing means determines the loss of pressure between the check valve and the pilot valves on each fuel dispenser.

7. A system according to claim 6 wherein the control means interrupts electric power to the pump upon detection of a pressure loss by the pressure-sensing means.

8. A system according to claim 7 including a plurality of fuel storage tanks and a pump associated with each tank.

9. A system according to claim 8 including a pressure-sensitive switch operationally interconnected with the supply line between the pump and each of the fuel dispensers.

10. A pressure-monitoring system for automotive fuel service stations comprising:

(a) means for sensing pressure in a line between a fuel supply source and a fuel dispenser;

(b) a pump for pressurizing the line;

(c) means for indicating an end of a dispensing operation; and (d) control means responsive to the pressure-sensing means and said indicating means for causing the pump to repressurize the line between the fuel supply source and the fuel dispenser when the pressure-sensing means senses the pressure below a predetermined pressure value during an indefinite time between dispensing operations.

* * * * *